US012496606B2

(12) United States Patent
Vollrath

(10) Patent No.: US 12,496,606 B2
(45) Date of Patent: Dec. 16, 2025

(54) SPRINKLER SYSTEM ATTACHMENT

(71) Applicant: Klaus M. A. Vollrath, City Beach (AU)

(72) Inventor: Klaus M. A. Vollrath, City Beach (AU)

(*) Notice: Subject to any disclaimer, the term of this patent is extended or adjusted under 35 U.S.C. 154(b) by 784 days.

(21) Appl. No.: 16/458,832

(22) Filed: Jul. 1, 2019

(65) Prior Publication Data

US 2020/0038898 A1 Feb. 6, 2020

Related U.S. Application Data

(60) Provisional application No. 62/764,425, filed on Aug. 1, 2018.

(51) Int. Cl.
*B05B 15/14* (2018.01)
*B05B 15/622* (2018.01)
*B05B 15/65* (2018.01)

(52) U.S. Cl.
CPC ........ *B05B 15/14* (2018.02); *B05B 15/622* (2018.02); *B05B 15/65* (2018.02)

(58) Field of Classification Search
CPC ....... B05B 15/14; B05B 15/622; B05B 15/65; B05B 15/652; F16L 33/24; F16L 27/108; F16L 27/1085; F16L 51/024
See application file for complete search history.

(56) References Cited

U.S. PATENT DOCUMENTS

| | | | | |
|---|---|---|---|---|
| 327,215 A * | 9/1885 | Youngs | ........ | F16L 51/024 285/390 |
| 486,986 A * | 11/1892 | Schinke | ........ | F16L 27/11 285/261 |
| 809,903 A * | 1/1906 | Bowers | ........ | F16L 51/024 464/80 |
| 2,777,464 A * | 1/1957 | Mosely | ........ | D06F 39/088 137/516.13 |
| 3,191,630 A * | 6/1965 | Demyan | ........ | G05D 7/0186 138/42 |
| 3,702,144 A * | 11/1972 | Loveland | ........ | F16K 47/10 138/44 |
| 3,759,445 A * | 9/1973 | King | ........ | A01G 25/00 285/239 |
| 3,764,073 A * | 10/1973 | Costa | ........ | B05B 15/65 239/233 |
| 3,894,562 A * | 7/1975 | Moseley, Jr. | ........ | F16L 55/027 138/44 |
| 4,018,386 A * | 4/1977 | Barichello | ........ | B05B 3/0472 239/230 |
| 4,179,142 A * | 12/1979 | Schopp | ........ | F16L 33/30 285/239 |

(Continued)

FOREIGN PATENT DOCUMENTS

GB 1209195 A * 10/1970 ............ F16L 27/108

Primary Examiner — Darren W Gorman
(74) Attorney, Agent, or Firm — Novel Patent Services LLC; Jurgen Vollrath

(57) ABSTRACT

In an installed sprinkler system, a sprinkler system attachment serves to absorb vertical and lateral forces that a sprinkler assembly or a protruding extension pipe may be exposed to, by providing a flexible body with one or more collapsible zones, having threaded ends or smooth, sliding-fit ends for connecting the sprinkler system attachment between two sections of the sprinkler system.

6 Claims, 11 Drawing Sheets

(56) References Cited

U.S. PATENT DOCUMENTS

| | | | | |
|---|---|---|---|---|
| 4,295,610 | A * | 10/1981 | Clements | B05B 3/0472 |
| | | | | 239/230 |
| 4,314,717 | A * | 2/1982 | Bjurman | B05B 15/652 |
| | | | | 285/5 |
| 4,717,181 | A * | 1/1988 | Maier | F16L 51/024 |
| | | | | 285/229 |
| 4,913,352 | A * | 4/1990 | Witty | B05B 15/74 |
| | | | | 239/104 |
| 5,507,436 | A * | 4/1996 | Ruttenberg | B05B 1/086 |
| | | | | 239/1 |
| 7,789,633 | B2 * | 9/2010 | Tash | F04F 5/461 |
| | | | | 417/198 |
| 8,157,192 | B2 * | 4/2012 | Claas | B05B 17/08 |
| | | | | 239/588 |
| 8,646,486 | B2 * | 2/2014 | Schommer | E03C 1/08 |
| | | | | 138/44 |
| 8,662,415 | B2 * | 3/2014 | Vollrath | B05B 15/74 |
| | | | | 239/204 |
| 9,377,128 | B2 * | 6/2016 | Twitchett | B05B 12/088 |
| 9,777,857 | B2 * | 10/2017 | Chen | F16K 15/148 |
| 2003/0155433 | A1 * | 8/2003 | Gregory | B05B 1/3026 |
| | | | | 239/203 |
| 2006/0273191 | A1 * | 12/2006 | Pastuch | F16L 11/10 |
| | | | | 239/588 |
| 2013/0160201 | A1 * | 6/2013 | Okubo | B05B 1/18 |
| | | | | 4/615 |
| 2017/0159859 | A1 * | 6/2017 | Claerhout | E21B 17/04 |
| 2018/0221895 | A1 * | 8/2018 | McCarty | B05B 3/0454 |

* cited by examiner

SPRINKLER SYSTEM ATTACHMENT

The present application, entitled Sprinkler System Attachment, claims priority from U.S. Provisional Application Ser. No. 62/764,425 filed Aug. 1, 2018 by the present applicant, Klaus Michael Andreas Vollrath, of 12 Malton Place, City Beach, WA, 6015 Australia, resident of Australia.

FIELD OF THE INVENTION

The invention relates to sprinkler systems. In particular it relates to attachments for installed sprinkler systems such as pop-up systems, including automatic sprinkler systems.

BACKGROUND OF THE INVENTION

Installed sprinkler systems, which may include pop-up sprinkler assemblies for lawns and sprayer attachments for flower beds suffer from a common weakness. They tend to break off when lateral or vertical pressure is exerted on them. This may happen if a car drives over a pop-up sprinkler on the side-walk or a tractor-mower drives over a pop-up sprinkler on a sports field, causing excessive vertical force to be exerted on the sprinkler assembly and underlying pipes. Typically, the feeder pipes, connectors, vertical extensions, and elbows are made of PVC that has very little inherent flexibility. Similarly, in the case of lateral forces exerted on PVC pipe extensions that support a sprinkler assembly, as is commonly found in certain flower-bed watering systems: such lateral pressure can cause the pipe extension or underground connector or elbow to snap off.

The present application seeks to address this problem by avoiding the cost of replacing broken sprinkler heads and piping, and by eliminate the time-consuming work of having to dig up and replace broken parts.

SUMMARY OF THE INVENTION

The present invention is directed specifically to installed sprinkler systems. For purposes of this application the term installed sprinkler system refers to any system that includes underground piping and sprinkler heads, and may include a control mechanism to facilitate watering of lawns and/or flower beds, trees and shrubs based on a programmed operator function.

Conventional installed sprinkler systems are manufactured to support pre-defined pipe sizes. The extension pipes, attachments, and sprayer heads—including pop-up sprinkler attachments—are therefore sized to support particular pre-defined pipe diameters that are common in the art of automatic sprinkler systems.

According to the invention there is provided a sprinkler attachment to accommodate vertical and lateral forces exerted on a sprinkler head or vertical extension pipe of an installed sprinkler system, comprising A flexible body with a threaded inlet and a threaded outlet, wherein the threaded inlet is configured to attach to a complementarily threaded pipe or extender of a conventional installed sprinkler system, and the flexible body is configured to have a collapsible zone to allow the body to collapse upon itself or inwardly when vertical downward pressure is exerted on the threaded outlet.

The threaded outlet is preferably configured to attach to a conventional pop-up sprinkler assembly or to a vertical extension pipe of a conventional installed sprinkler system.

One or both of the threaded inlet and threaded outlet may comprise a neck with an internal or external thread.

In one embodiment the body in vertical section may define a housing and will therefore also be referred to herein as a housing. The body (or housing) may include one or more sections, each section having diverging or converging walls, with the threaded inlet and threaded outlet at opposite ends of the housing, spaced substantially 180 degrees apart.

The housing may include two housing sections with bowed or flared walls, the housing-sections being joined by a narrow neck region.

The housing may comprise a substantially spherical or ellipsoid body, or a hemispherical body.

In another embodiment, the body may define a housing with an inwardly-bowed wall having a convex, inner surface, with the threaded inlet and threaded outlet at opposite ends, spaced substantially 180 degrees apart.

In yet another embodiment the body may comprise a substantially cylindrical housing with a collapsible zone operable to allow the housing to collapse inwardly or also referred to as collapsing upon itself when a compressive force is exerted between the inlet and outlet. The collapsible zone may include a thinned wall section along the cylindrical wall of the body.

Further, according to the invention, there is provided a method of protecting an installed sprinkler system against damage from vertical downward forces exerted on a pop-up sprinkler assembly, comprising, providing a flexibly deformable body between the sprinkler assembly and underlying connectors or piping.

The flexibly deformable body may be located below or above ground.

To protect a pop-up sprinkler assembly against vertical downward forces, the flexibly deformable body may be provided below the ground, between the pop-up sprinkler assembly and the underlying connectors or piping that feed that pop-up sprinkler assembly.

To protect a vertical extension pipe of an installed sprinkler against damage from lateral forces, the flexibly deformable body may be provided between the extension pipe and the underlying connectors or piping that feed the extension pipe.

DETAILED DESCRIPTION OF THE INVENTION

Figure 1:
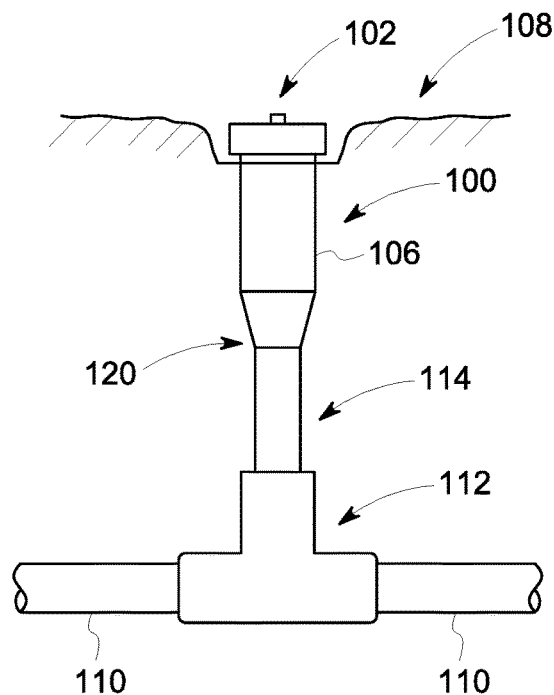
FIG. 1 shows a typical prior art sprinkler system with a sprinkler assembly in its retracted configuration.
Figure 2:
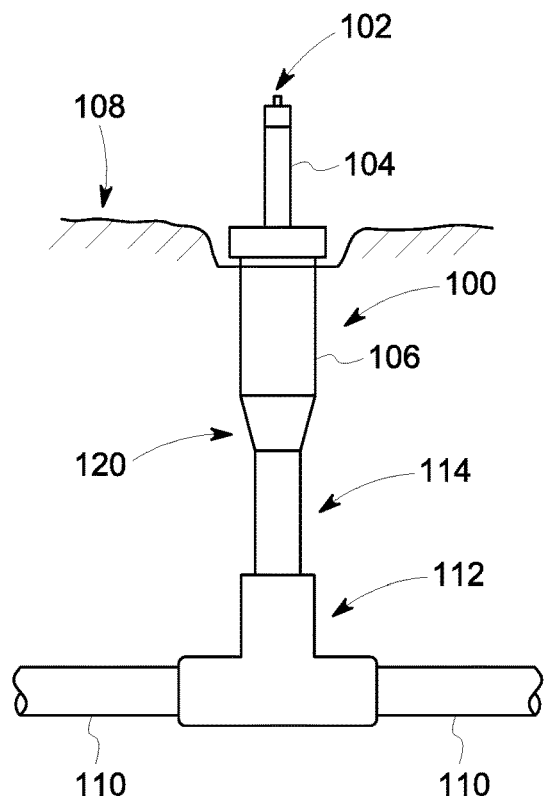
FIG. 2 shows the sprinkler system of FIG. 1 with the sprinkler assembly in an extended configuration.

A typical installed sprinkler system as known in the art comprises one or more sprinkler assemblies 100 as shown in FIGS. 1 and 2. The sprinkler assembly 100 in this embodiment includes a sprayer head 102, which forms part of a slidable extender 104 (FIG. 2). Under the influence of water pressure, the extender 104 with the sprayer head 102 moves upwardly from a retracted configuration as shown in FIG. 1, to an extended configuration as shown in FIG. 2. The housing 106 of the assembly 100 is typically buried under the surface of the ground, so that only the extender 104 and head 102 extend above ground during operation, as is depicted by the sectional side-view through the ground 108. The water pressure to supply water to the sprinkler head 102 and to move the extender 104 upward, is provided via a sub-terranean feeder pipe 110.

In the present embodiment, the sprinkler assembly 100 is connected to the feeder pipe 110 by means of a connector— in this case a T-connector 112. Vertical extension section 114 in this embodiment, connects the sprinkler assembly 100 to the connector 112, and serves also to adjust the height of the sprinkler assembler 100 during installation of the sprinkler system to ensure the correct height of the assembly 100 relative to the surface of the ground 108.

In practice, when sprinkler systems are installed on sports fields or sprinkler assemblies are located along sidewalks, foot traffic and vehicle traffic may, on occasion, exert a vertical force on sprinkler assemblies. In the case of sports fields, driving mowers and tractors are commonly used to care for the grounds. When these vehicles drive over a sprinkler assembly, or pedestrians step on a sprinkler assembly, the resultant force on the assembly is transmitted to the system below, since the ground (lawn and sand or soil) in which the sprinkler system is installed typically does not rigidly hold the sprinkler system but affords it some give. The vertical force therefore exerts pressure on the sprinkler assembly 100, as well as the vertical pipe sections, such as the extension section 114, and the connectors such as the connector 112, and the underlying piping, such as the feeder pipe 110. These sprinkler assemblies, pipes, and connectors are typically made of a relatively inflexible plastics material such as PVC and, given sufficient force, will cause them to break. If this break occurs at the foot 120 of the sprinkler assembly 100 it may require replacement of the entire sprinkler assembly. Even if the assembly 100 remains intact, the connector section 114, connector 112 or feeder pipe 110 may be damaged, requiring a fair amount of work to dig up the affected portions of the sprinkler system in order to get to the broken portion for purposes of replacing it. All of this is a time-consuming and costly exercise.

Figure 3:
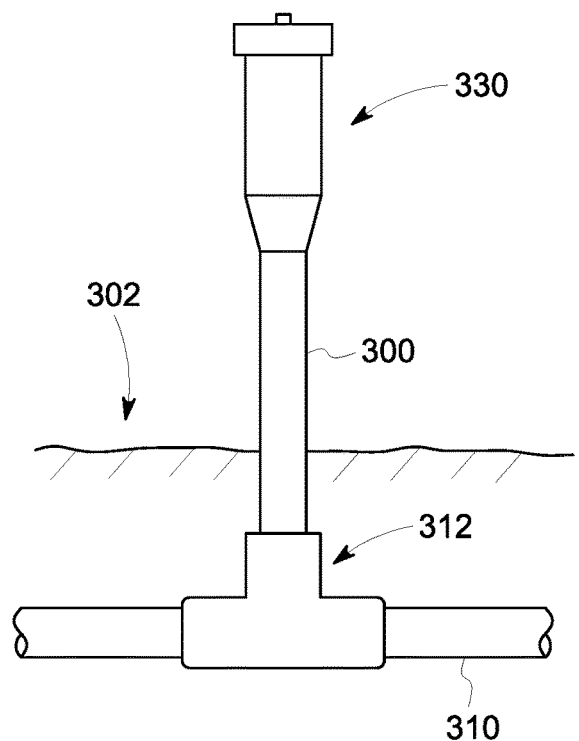
FIG. 3 shows another common, prior art sprinkler system.

In another sprinkler system embodiment, as is commonly found in flower bed watering systems, vertical extension pipes may extend above ground to position sprinkler heads above ground for elevated watering. One such embodiment is shown in FIG. 3, in which a vertical extension pipe 300 made of PVC extends above ground level 302, to feed water from a feeder pipe 310 via a connector 312, to a sprinkler assembly 330. The weakness in this system lies in the vertical extension pipe 300, which is prone to snap off if excessive lateral pressure is exerted on the pipe 300, as may happen if a person or animal inadvertently bumps or brushes against the pipe 300 or the sprinkler assembly 330.

The present application provides a solution to the above problems by providing a flexible attachment or connector section, which serves to absorb vertical and lateral forces. For ease of reference this attachment will be referred to herein as a sprinkler system attachment.

Figure 4:
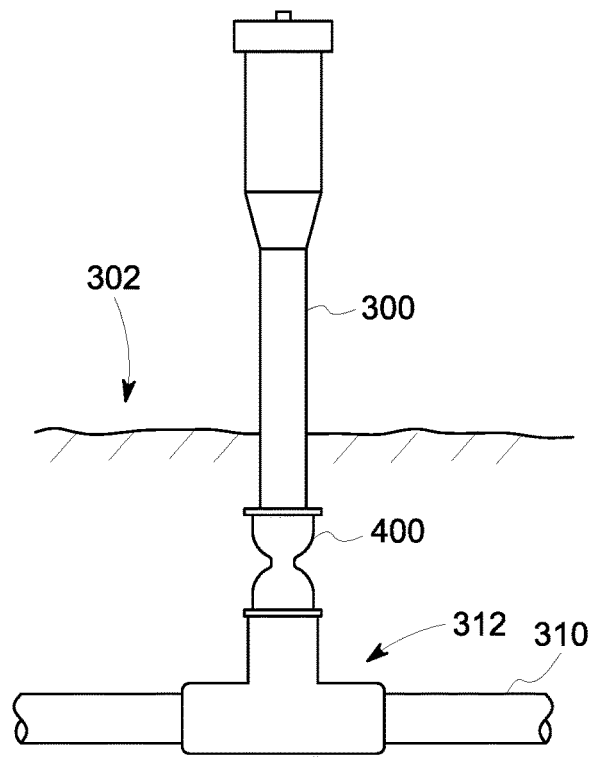
FIG. 4 shows the system of FIG. 3 with one embodiment of a sprinkler system attachment of the invention.
Figure 5:
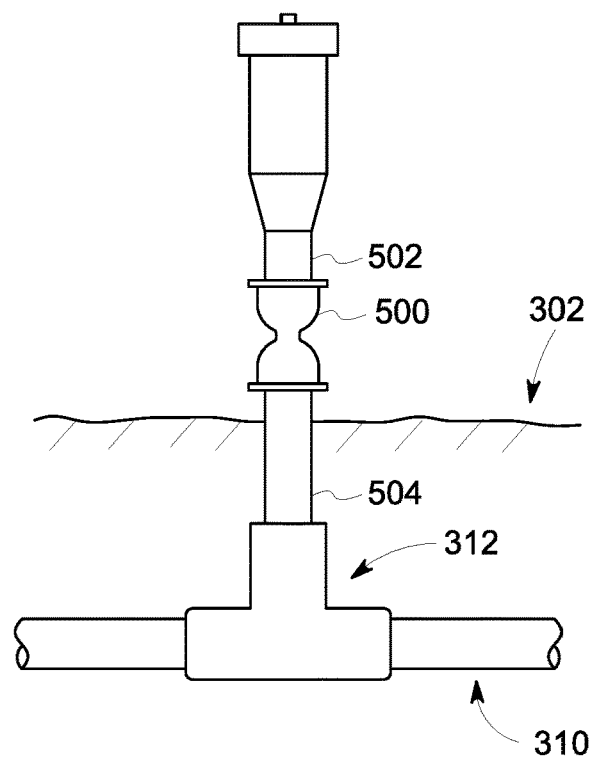
FIG. 5 shows a variation of the system of FIG. 3 with one embodiment of a sprinkler system attachment of the invention, provided in a different location.

The sprinkler system attachment may be positioned anywhere between a sprinkler assembly and the feeder pipe. In the case of the vertical extension pipe 300 shown in FIG. 3, the sprinkler system attachment, which is discussed in greater detail below, may for example be connected between the extension pipe 300 and the connector 312 as illustrated by the sprinkler system attachment 400 in FIG. 4. Instead the sprinkler system attachment may be located just above ground between two vertical extension pipe sections 502, 504 as illustrated by the sprinkler system attachment 500 in FIG. 5.

It will be appreciated that a flexible sprinkler system attachment 400, 500 will avoid lateral forces on the extension pipe 300 or pipe section 502 from being transmitted to the connector 312 and avoid the extension pipe 300 or pipe section 504 from snapping off at the connector 312.

Figure 6:
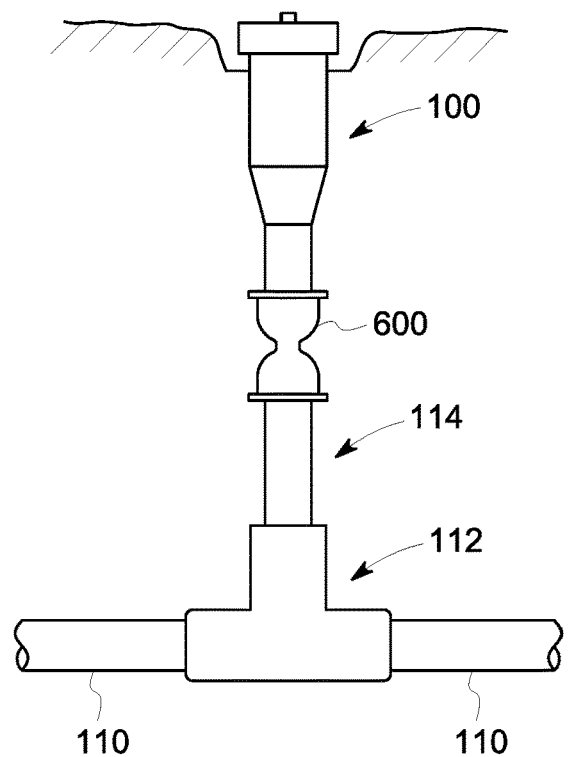
FIG. 6 shows the system of FIG. 1 with one embodiment of a sprinkler system attachment of the invention.

Similarly, in the pop-up sprinkler arrangement discussed above with respect to FIGS. 1 and 2, a flexible sprinkler system attachment of the present application avoids vertical forces exerted on a sprinkler assembly from being transmitted to the underlying piping and connectors. In one embodiment, a sprinkler system attachment 600 is provided between the sprinkler assembly 100 and the feeder pipe 110 by connecting it between the sprinkler assembly 100 and the vertical extension section 114, as shown in FIG. 6.

The importance of the sprinkler system attachment of the present application lies in the fact that it defines a body or housing made of a flexible material that allows it to deform. In particular, the housing is designed to collapse in on itself (as is discussed in more detail below) if a pre-determined vertical force is exceeded, e.g., if a person steps on the sprinkler assembly 100, or if any other vertical force is exerted that would be sufficient to cause damage to any part of the installed sprinkler system. In order to easily insert the sprinkler system attachment between two sections of a sprinkler system, the sprinkler system attachment in one embodiment, is provided with a threaded inlet and a threaded outlet to complementarily engage a sprinkler assembly, or a threaded extension tube, or connector, of a sprinkler system. The threaded inlets may be either internally or externally threaded depending on the sprinkler system it is used with and the nature of any connector pipes that need to couple with the sprinkler system attachment. The exact configuration of the housing of the sprinkler system attachment may vary from one embodiment to another—the important aspect being that the housing is deformable. However, even though the housing is designed to collapse when vertical compressive forces act on it, the shape of the housing and/or the material of the housing is also designed to avoid vertical elongation (lengthening) of the housing (body) when water pressure builds up within the housing as water passes from the inlet to the outlet. The reason for this is that the housing may not fully recover its shape if allowed to extend vertically. For example, the soil surrounding the housing may collapse around the housing if the housing were allowed to lengthen and narrow, thus preventing it from fully retracting the sprinkler assembly once the water pressure is removed. In order to accommodate the vertically compressive forces, the housing may have angled walls or bowed walls with a concave or convex inner surface, or may define one or more thinned wall sections configured to provide one or more collapsible zones, as is discussed in greater detail below.

Figure 7:
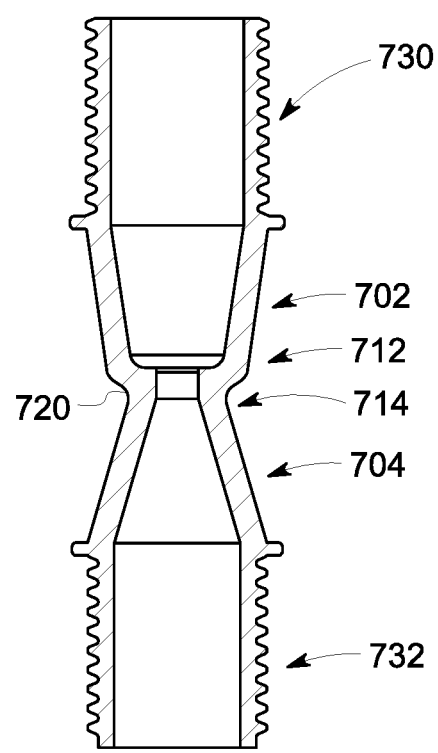
FIG. 7 shows a sectional side view of one embodiment of a sprinkler system attachment of the invention.
Figure 8:
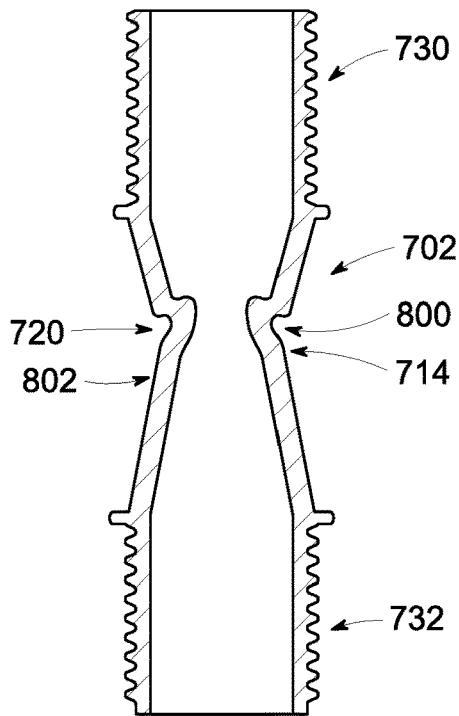
FIG. 8 shows the embodiment of FIG. 7 in a deformed state when vertical downward pressure is exerted on the sprinkler system attachment.

One embodiment of a sprinkler system attachment is shown in FIG. 7. In this embodiment, the body or housing includes two frusto-conical sections 702, 704 connected at their narrow ends. The narrow end 714 of the frusto-conical section 704 in this embodiment is narrower than the narrow end 712 of section 702. The end 714 connects to the end 712 via a neck region 720. When a sufficient compressive force is exerted along the longitudinal axis of the sprinkler system between the outlet neck portion 730 and inlet neck portion 732 (which in the configuration shown in FIG. 7, would correspond to vertical pressure on the sprinkler system attachment, the resultant force of the narrow end 714 on the neck region 720, will cause the frusto-conical section 702 to collapse on itself at the collapsible zone 800, as shown in FIG. 8. It will be appreciated that the section 704 may also collapse inward, thereby providing a potential second collapsible zone 802.

For ease of attachment to threaded pipes, connectors, or assemblies of a sprinkler system, such as the connector section 114 and the assembly 100 (as was discussed with respect to FIG. 6), the sprinkler attachment shown in FIGS. 7 and 8 includes output and input neck portions 730, 732 that are threaded. While externally threaded sections 730, 732 are provided in this embodiment, it will be appreciated that internally threaded sections could be provided instead on one or both ends of the attachment.

In yet another embodiment, the cylindrical ends of the sprinkler attachment may not be threaded but may be sized to simply engage slidably with a conventional-size sprinkler system part, such as pipes, connectors, extensions or sprinkler assemblies, of a conventional installed sprinkler system (also referred to herein as conventional sprinkler system part), and secured with adhesive.

Figure 9:
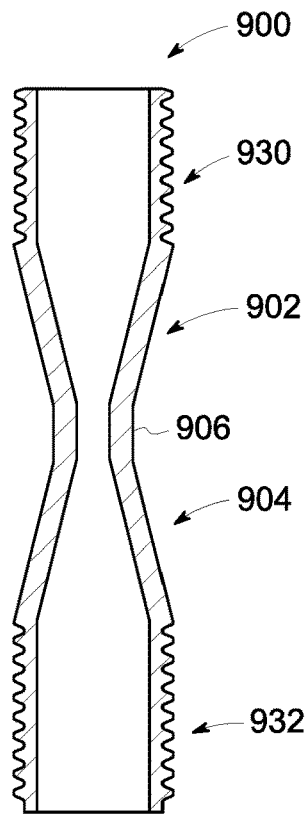
FIG. 9 shows a sectional side view of another embodiment of a sprinkler system attachment of the invention.

Another embodiment of a sprinkler system assembly of this application is shown in FIG. 9. In this embodiment, the body 900 again includes two sections 902, 904 having facing narrow ends. The narrow ends are joined by a neck 906, which in this embodiment defines a cylindrical neck. The wide ends of the two sections 902, 904, in this embodiment, are again provided with externally threaded sections 930, 932.

Figure 10:
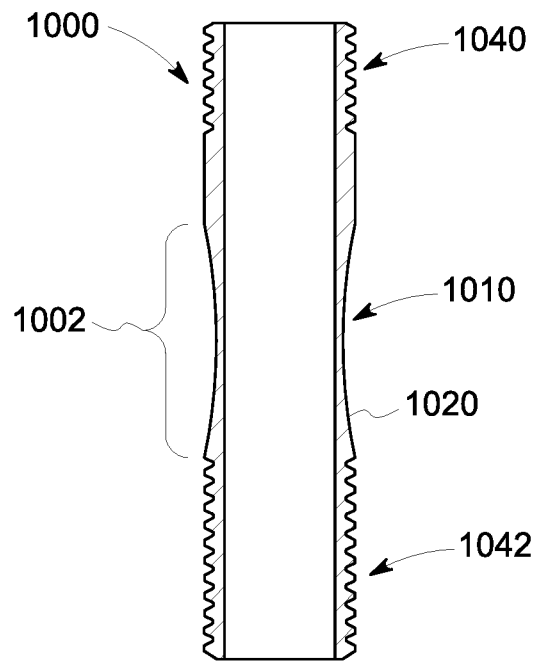
FIG. 10 shows a sectional side view of another embodiment of a sprinkler system attachment of the invention.

Yet another embodiment of a sprinkler system attachment of this application is shown in FIG. 10. In this embodiment, the body 1000 defines a substantially cylindrical portion with a thin-wall section 1002, which in this embodiment comprises an indentation of the outer surface 1010 of the body wall 1020. The sprinkler system attachment of FIG. 10 again has outer threaded ends 1040, 1042. When a compressive force is exerted between the two threaded ends 1040, 1042, the thin-walled section will collapse inwardly and eventually crumple and collapse on itself.

Figure 11:
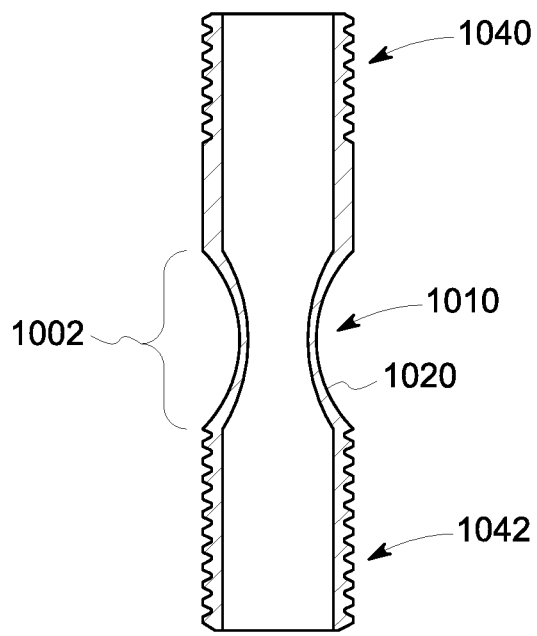
FIG. 11 shows the embodiment of FIG. 10 in a partially deformed state when vertical downward pressure is exerted on the sprinkler system attachment.
Figure 12:
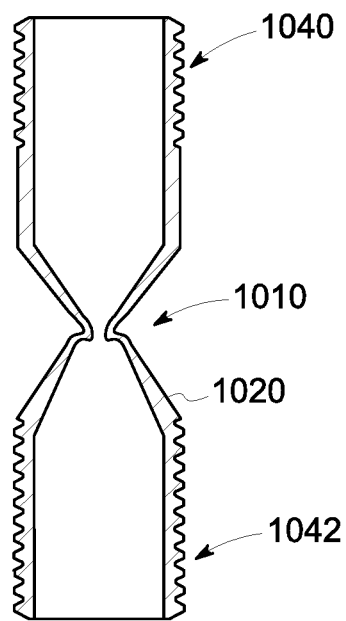
FIG. 12 shows the embodiment of FIG. 10 in a deformed state as vertical downward pressure continues to be exerted on the sprinkler system attachment.

FIG. 11 shows the embodiment of FIG. 10 in a partially collapsed state as a compressive force is exerted between the two outer ends, along the longitudinal axis of the sprinkler system attachment. As can be seen in FIG. 11, the wall 1020 begins to collapse inwardly at the thin-wall section 1002. Thus, the thin-wall section 1002 defines a collapsible zone that allows the sprinkler system attachment to absorb the compressive force (which, in the depicted configuration, corresponds to a downward force on the threaded end 1040 relative to the threaded end 1042). As the compressive or downward force continues, the sprinkler system attachment continues to deform as shown in FIG. 12.

Figure 13:
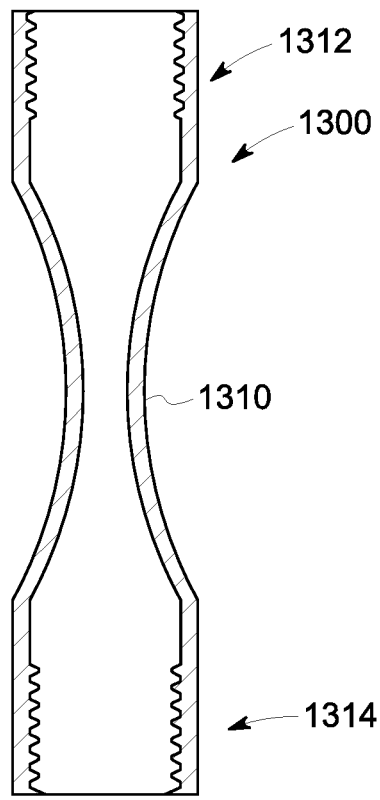
FIG. 13 shows a sectional side view of yet another embodiment of a sprinkler system attachment of the invention.

Yet another embodiment of a sprinkler system attachment of the present application is shown in FIG. 13. In this embodiment the body 1300 of the assembly has inwardly bowed walls 1310 with threaded end sections 1312, 1314. When a compressive force is exerted along the central axis, between the end sections 1312, 1314, the bowed walls 1310 will collapse inwardly, thereby defining a collapsible zone. In this embodiment the threaded sections 1312, 1314 are internally threaded sections to accommodate complementary externally threaded sprinkler system parts. It will be appreciated that other embodiments could have one internally threaded end and one externally threaded end, or one or more unthreaded neck portions that slidably engage with complementary sprinkler system parts.

Figure 14:
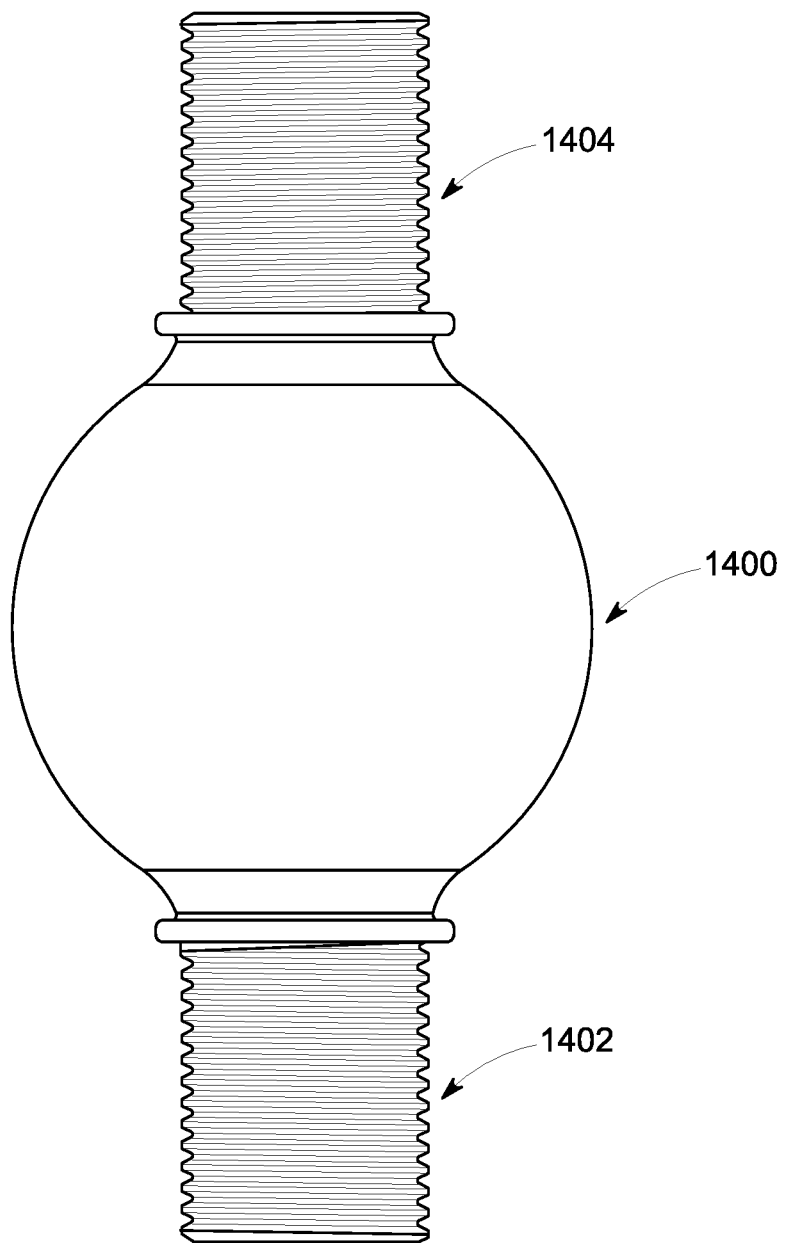
FIG. 14 shows a side view of yet another embodiment of a sprinkler system attachment of the invention.
Figure 15:
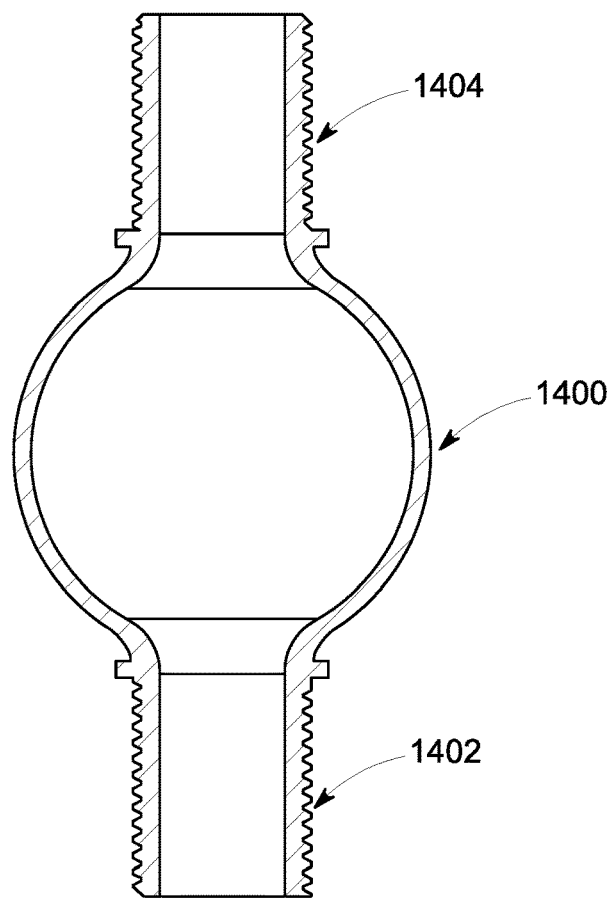
FIG. 15 shows a sectional side view of the embodiment of FIG. 14.

Another embodiment of a sprinkler system attachment of the present application is shown in FIGS. 14 and 15.

In the embodiment of FIGS. 14 and 15, FIG. 14 shows a side view of the sprinkler system attachment, while FIG. 15 shows the attachment in vertical cross-section. The body 1400 of the attachment has a substantially spherical shape. It will be appreciated that it could also be longer or shorter along the vertical axis, which will also be referred to herein as ellipsoid, giving it substantially a football shape. Again, a threaded inlet neck portion 1402 and threaded outlet neck portion 1404 extend from opposite ends of the body 1400. Again it will be appreciated that the inlet and outlet may instead be configured as cylindrical neck portions with an inner thread or with smooth walls to slidably engage with complementary sprinkler system parts. Also, a variation of this embodiment would be to have internal neck portions. In such an embodiment the cylindrical inlet and outlet neck portions would not be extending from either side of the body of the sprinkler system attachment but would extend inwardly into the body, while leaving enough space between the inlet and outlet neck portions to avoid them impinging on one another when the sprinkler system attachment is compressed by vertical forces acting on it.

Also, the inlet and outlet neck portions 1402, 1404 in this embodiment are shown as extending from opposite ends of the body 1400. However, in other embodiments the inlet and outlet neck portions may be arranged to extend from or into different parts of the body. For instance, the inlet and outlet neck portions may extend from the body at 90 degrees to each other to define an elbow. In such a configuration the inlet neck portion could be connected to a horizontal feeder pipe, while the outlet neck portion is connected to a vertical extender pipe or other vertically extending section of a conventional installed sprinkler system.

Figure 16:
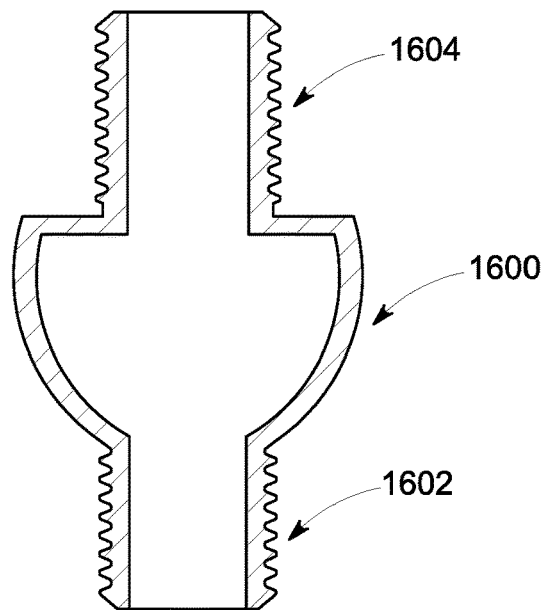
FIG. 16 shows a sectional side view of yet another embodiment of a sprinkler system attachment of the invention.

Another embodiment of a sprinkler system attachment of the invention is shown in vertical cross-section in FIG. 16. The body 1600 of the sprinkler system attachment shown in FIG. 16 is substantially hemispherical in shape with threaded inlet 1602 and threaded outlet 1604 extending from the body.

Figure 17:
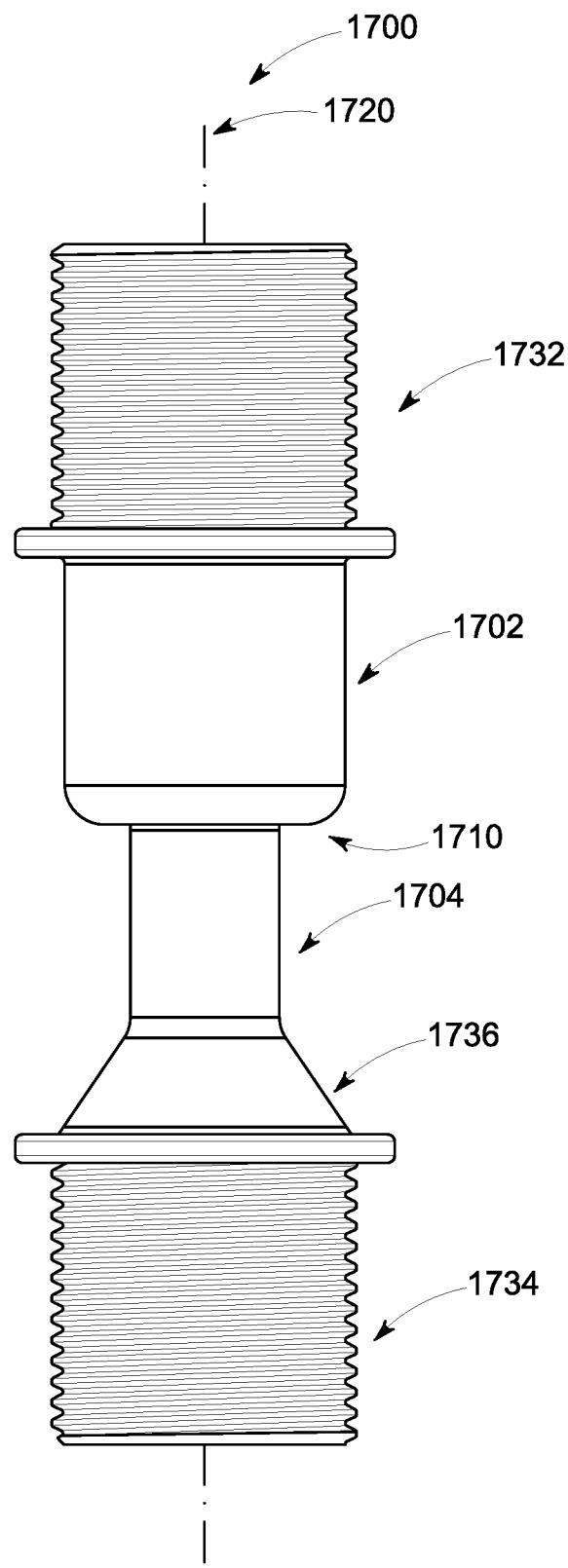
FIG. 17 shows a side view of yet another embodiment of a sprinkler system attachment of the invention.
Figure 18:
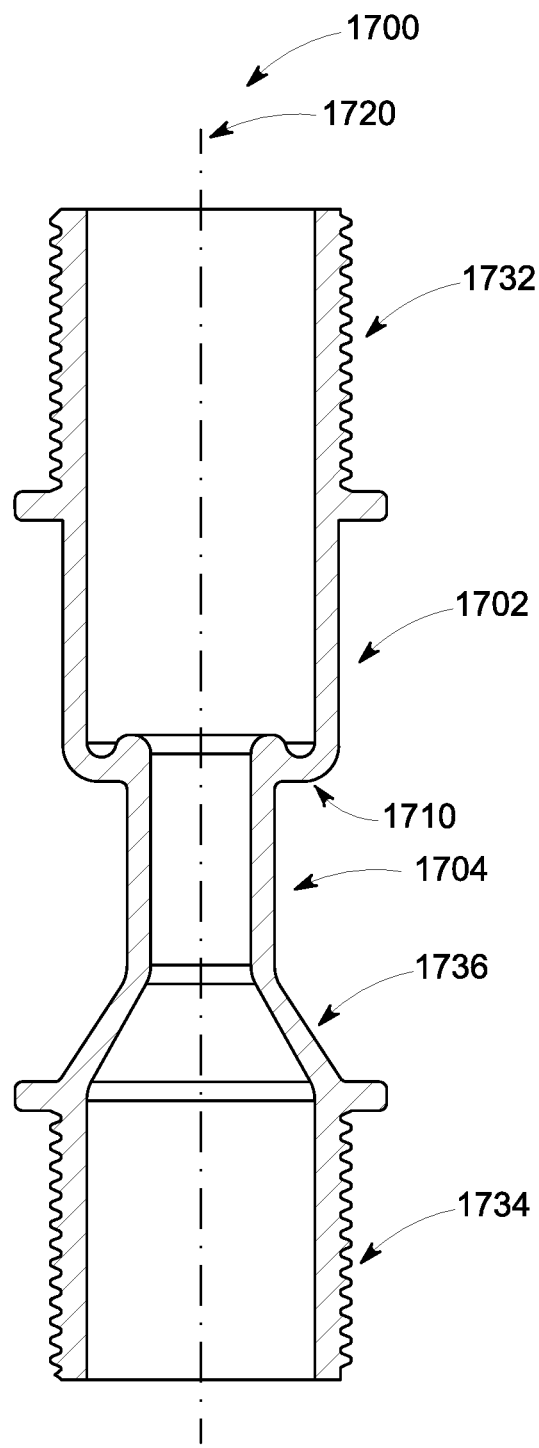
FIG. 18 shows a sectional side view of the embodiment of FIG. 17.

Yet another embodiment of a sprinkler system attachment of the invention is shown from the side in FIG. 17 and in vertical cross-section in FIG. 18. The housing or body 1700 in this embodiment includes two substantially cylindrical sections 1702, 1704, wherein the section 1702 has a wider diameter than section 1704. In order to connect the two sections, the wider section 1702 has an inwardly extending annular lip 1710 configured to collapse or roll the wall of section 1702 inwardly and upward, as shown in FIG. 18, when a compressive force is exerted along the longitudinal axis 1720 between the sections 1702 and 1704. A threaded inlet neck portion 1734 extends from the section 1704 and a threaded outlet neck portion 1732 extends from the section 1702. In order to accommodate the wider diameter threaded inlet neck portion 1734, the narrow section 1704 extends into a frusto-conical section 1736. It will be appreciated that in this application, the terms: inlet and outlet are used arbitrarily to best describe the configuration as it is shown in each embodiment. However, since the various embodiments could also be implemented in an upside-down fashion where the top is then the bottom, it will be appreciated that the outlet will then become the inlet and the inlet will become the outlet.

It will also be appreciated that in each of the embodiments in which the sprinkler system attachment is buried in the ground, the surrounding soil acts as a restraint that limits outward deformation. Hence the sprinkler system attachment in each of the embodiments is configured so that the collapsible zone provides for inward collapsing of the body or allows the body to crumple or collapse on itself. While this is not a necessary requirement in lateral force applications such as that described with respect to FIGS. 4 and 5, and particularly in the implementation of FIG. 5, where the sprinkler system attachment is above the ground, the present sprinkler system attachment still provides a helpful component for gardeners and people installing installed sprinkler systems. Even though a simple flexible pipe section could be used in such lateral force applications instead, the convenience of using the sprinkler system attachment of the present application, with its threaded neck portions adapted to attach complementarily with commonly used sprinkler systems, or with smooth inner (smooth-bore) or smooth outer neck portions to slidably receive common PVC pipe sections, would make it the more suitable choice.

While the present invention has been described with respect to specific embodiment, it will be appreciated that other configurations of the sprinkler system attachment could be implemented having collapsible zones that allow for inward deformation, without departing from the scope of the invention.

What is claimed is:

1. A sprinkler attachment to accommodate vertical and lateral forces exerted on a sprinkler head or on a vertical extension pipe of an installed sprinkler system, comprising
a single flexible, substantially spherical, ellipsoid, or hemispherical body with a cylindrical threaded inlet neck portion and a cylindrical threaded outlet neck portion extending from opposite ends of said body, wherein the flexible body is made of a material that is sufficiently resilient to prevent stretching when water passes from the inlet neck portion to the outlet neck portion to avoid vertical elongation, and will collapse upon itself when a compressive vertical force is exerted between the inlet and outlet neck portions and will fully recover its shape when the compressive force is removed, and has a shape that is configured to prevent narrowing of the body when a compressive vertical force is exerted on the body, and
wherein said threaded inlet and outlet neck portions are sized and threaded to complementarily engage with threaded ends of a conventional part of a conventional installed sprinkler system.

2. A sprinkler attachment of claim 1, wherein the conventional sprinkler system part includes an extension pipe, connector, extender, or sprinkler assembly of a conventional installed sprinkler system.

3. A method of protecting an installed sprinkler system against damage from lateral and vertical downward forces exerted on a sprinkler assembly, comprising,
providing a resiliently flexible, substantially spherical, ellipsoid, or hemispherical deformable body that defines a single spherical, ellipsoid, or hemispherical deformable structure with threaded inlet and outlet neck portions that extend from opposite ends of the substantially spherical, ellipsoid, or hemispherical body, wherein the body is configured to collapse upon itself when a compressive force is exerted between the inlet and outlet neck portions and fully recover its shape when the compressive force is removed, wherein the body is made of a material that is sufficiently resilient to prevent stretching when water passes from the inlet neck portion to the outlet neck portion to avoid vertical elongation, and the body is configured to prevent narrowing of the body when a compressive force is exerted on the body, and wherein the threaded inlet and outlet neck portions that extend from opposite ends of the flexibly deformable body are sized and threaded to complementarily engage with threaded ends of extension pipes, connectors, or extenders, of a conventional installed sprinkler system.

4. A method of claim 3, wherein the flexibly deformable body is installed below or above ground.

5. A method of claim 4, wherein, in order to protect an installed sprinkler system against vertical downward forces, the flexibly deformable body is installed below the ground, between the sprinkler assembly and the underlying connectors or piping that feed that sprinkler assembly.

6. A method of claim 4, wherein, in order to protect an installed sprinkler system against damage from lateral forces exerted on a vertical extension pipe or sprinkler assembly, the flexibly deformable body is provided above the ground between the extension pipe and the underlying connectors or piping that feed the extension pipe.

* * * * *